Patented Jan. 9, 1923.

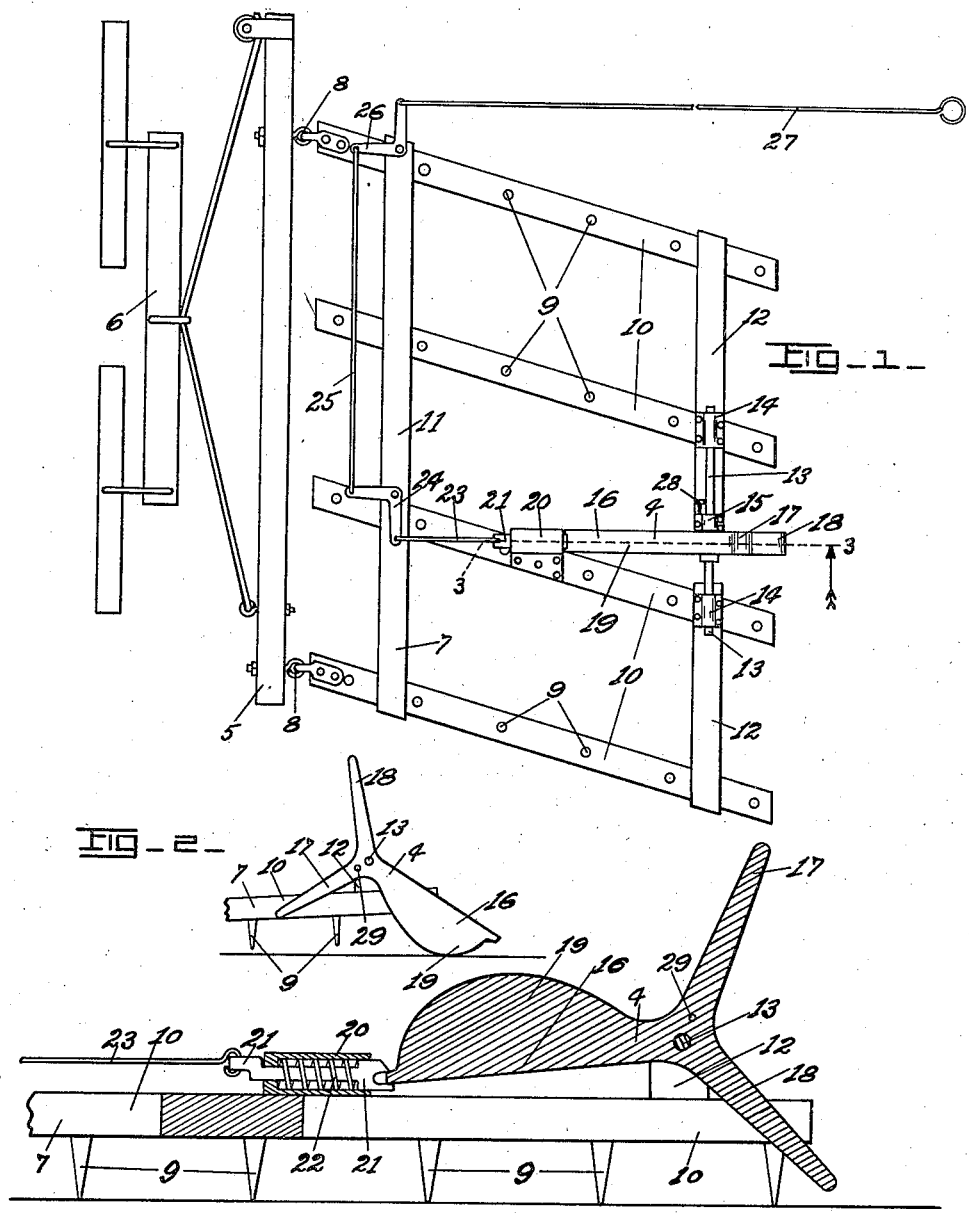

1,441,448

UNITED STATES PATENT OFFICE.

WALTER E. PISCHKE, OF LEOLA, SOUTH DAKOTA.

HARROW ATTACHMENT.

Application filed July 25, 1921. Serial No. 487,380.

*To all whom it may concern:*

Be it known that I, WALTER E. PISCHKE, a citizen of the United States, residing at Leola, in the county of McPherson and State of South Dakota, have invented certain new and useful Improvements in Harrow Attachments, of which the following is a specification.

This invention relates to harrows and the main object is to provide a simple, efficient and practical attachment for an ordinary drag harrow, which will, upon being tripped by the operator, clear the harrow of weeds and other rubbish, which, as is well known, often gathers and bunches up thereunder. Further objects will be disclosed in the course of the following specification and are illustrated in the accompanying drawing, in which:

Fig. 1 is a plan view of one end of a harrow, showing a complete section thereof embodying my invention.

Fig. 2 is a fractional detail side view of the rotating member 4.

Fig. 3 is an enlarged detail section, as seen substantially on the line 3—3 in Fig. 1.

Referring to the drawing by reference characters 5 designates an end portion of the evener of a drag harrow, to the front end of which are secured the customary double trees 6. The harrow proper consists usually of from three to seven sections 7 (only one of which is shown) which are hingedly secured as at 8 to the evener or draft beam 5. Each of the sections is provided with the usual harrow teeth 9, and is composed of a series of angular bars 10 connected by transverse braces 11 and 12.

When installing my invention in the harrow as above described, I first cut out a piece at the middle of the brace 12 and substitute therefor a shaft 13 which is secured on the brace ends by suitable brackets 14 and 15. Rotatably mounted on the shaft 13 is the member 4 which consists of three radial arms 16, 17 and 18, extending each away from the other two. The arm 16 is somewhat longer than the other two and is provided with an integrally formed web or shoe 19 which rides on the ground, when so desired, as indicated in Fig. 2.

On one of the tooth bars 10 is secured a small cylinder 20 in which is slidably mounted a latch or bolt 21, the same being normally held rearward (toward the member 4) by a suitable spring 22. The latch 21 is connected by a wire 23 to one arm of a bell-crank-lever 24, the other arm of which is connected by a wire 25 to a second bell-crank-lever 26, the latter being normally actuated through a wire 27 by the operator. The latch 21 is beveled at its upper rear end and is provided with a jaw immediately thereunder so that when the arm 16 drops down onto it, it will automatically snap into place and remain so until released by the operator.

When the harrow is being pulled forward over a field, it is found that quite frequently a large bunch of weeds and other rubbish will gather and bunch up under the sections, sticking to the teeth 9. When this occurs the operator pulls the wire 27 releasing the arm 16, which then falls on the ground. The continued forward motion of the harrow will then cause each section tripped to be lifted up as the arm 16 passes rearward thereunder. As the arm 16 completes its rearward stroke the arm 17 does the same, as does also the arm 18 thereafter. As soon, however, as the arm 16 reaches its forward position again it snaps into the bolt 21, thus locking the member 4 until it is again to be used. It will be understood that for each time the section is raised, as above described, the rubbish gathered will be permitted to drop from the teeth and be left remaining behind.

A pin 28 is slidably mounted in the bracket 15 and the member 4 is provided with a perforation 29 adapted to be engaged by said pin when the shoe 19 is in its lowest rearward position, as indicated in Fig. 2. The member 4 may be thus secured in this position when it is desired to pull the harrow over the ground when not harrowing, as most of the teeth 9 are then kept off the ground, consequently making the machine easier to pull.

It is understood that various modifications may be made in this invention, and that the form and construction herein disclosed is purely illustrative, and not to be interpreted in a limiting sense. Any modifications, however, are to be within the spirit and scope of the appended claims. Having now therefore fully shown and described my invention what I claim to be new and desire to protect by Letters Patent is:

1. In combination with a harrow section, a clearing member rotatably secured thereon and having a series of radial arms, one of said arms being longer than the others, a latch adapted to engage said longer arm and means for manually actuating said latch, said longer arm having an integral shoe and means for securing the clearing member so that said shoe will ride on the ground.

2. In combination with a harrow section, a clearing member rotatably secured thereon and having a series of radial arms, one of said arms being longer than the others, means for releasably securing said clearing member in idle position, and secondary means for securing the clearing member so that said longer arm will ride on the ground.

3. In combination with a harrow section, a clearing member rotatably secured thereon and having a series of radial arms, one of said arms being longer than the others and having an integral shoe, and means for securing the clearing member so that said shoe will ride on the ground.

4. In combination with a harrow section, a clearing member rotatably secured thereon and having a series of radial arms, one of said arms being longer than the others and having an integral shoe, and means for securing the clearing member so that said shoe will ride on the ground, said means consisting of a pin slidably mounted on the harrow section and engageable with the clearing member.

In testimony whereof I affix my signature.

WALTER E. PISCHKE.